United States Patent
Yao et al.

(10) Patent No.: US 11,139,855 B2
(45) Date of Patent: Oct. 5, 2021

(54) FREQUENCY HOPPING METHOD FOR MACHINE TYPE COMMUNICATION

(71) Applicant: NOKIA SOLUTIONS AND NETWORKS OY, Espoo (FI)

(72) Inventors: Chun Hai Yao, Beijing (CN); Rapeepat Ratasuk, Hoffman Estates, IL (US); Nitin Mangalvedhe, Hoffman Estates, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/903,139

(22) Filed: Jun. 16, 2020

(65) Prior Publication Data
US 2020/0350950 A1 Nov. 5, 2020

Related U.S. Application Data

(63) Continuation of application No. 15/564,872, filed as application No. PCT/US2015/025138 on Apr. 9, 2015, now abandoned.

(51) Int. Cl.
| | |
|---|---|
| *H04B 1/7143* | (2011.01) |
| *H04W 4/70* | (2018.01) |
| *H04B 1/715* | (2011.01) |
| *H04L 29/08* | (2006.01) |
| *H04W 72/04* | (2009.01) |

(52) U.S. Cl.
CPC ............ *H04B 1/7143* (2013.01); *H04W 4/70* (2018.02); *H04B 2001/7154* (2013.01); *H04L 69/323* (2013.01); *H04W 72/042* (2013.01)

(58) Field of Classification Search
CPC ......... H04B 1/7143; H04B 2001/7154; H04W 4/00; H04W 72/042; H04L 69/323
See application file for complete search history.

(56) References Cited

U.S. PATENT DOCUMENTS

| | | |
|---|---|---|
| 4,956,644 A | 9/1990 | Leahy |
| 2008/0045272 A1 | 2/2008 | Wang et al. |
| 2009/0238141 A1 | 9/2009 | Damnjanovic et al. |
| 2013/0286918 A1 | 10/2013 | Park et al. |
| 2013/0294399 A1 | 11/2013 | Lee |

(Continued)

FOREIGN PATENT DOCUMENTS

| | | |
|---|---|---|
| WO | 2014/048261 A1 | 4/2014 |
| WO | 2014/069946 A1 | 5/2014 |

OTHER PUBLICATIONS

Extended European Search Report corresponding to Application No. 15888676.2, dated Dec. 20, 2018. Copy submitted in parent U.S. Appl. No. 15/564,872.

(Continued)

*Primary Examiner* — Janice N Tieu
(74) *Attorney, Agent, or Firm* — Squire Patton Boggs (US) LLP

(57) ABSTRACT

A method and apparatus may include receiving, by a machine type communication user equipment, parameters for frequency hopping in downlink or uplink. The parameters comprise an "X," "Y," and "Z" parameters, "X" corresponds to a duration for which the same physical resource blocks are used for transmission. "Y" corresponds to a frequency hopping period, and "Z" corresponds to a frequency hopping pattern indication. The method may also include performing frequency hopping in accordance with the parameters.

33 Claims, 6 Drawing Sheets

(56) References Cited

U.S. PATENT DOCUMENTS

| | | |
|---|---|---|
| 2015/0085787 A1 | 3/2015 | Ouchi |
| 2015/0270868 A1 | 9/2015 | Park |
| 2016/0218788 A1 | 7/2016 | Yum |
| 2017/0347350 A1 | 11/2017 | Takeda |
| 2018/0035424 A1 | 2/2018 | Sun |

OTHER PUBLICATIONS

NTT Docomo et al., "WF on PDSCH for Rel-13 Low Complexity UE," 3GPP TSG RAN WG1 Meeting #80, Athens, Greece, Feb. 9-13, 2015, R1-150871, 2 pages, Retrieved from the Internet: URL: http://www.3gpp.org/ftp/tsg_ran/WG1_RL1/TSGR1_80/Docs/. Copy submitted in parent U.S. Appl. No. 15/564,872.

NEC, "Frequency hopping schemes for LTE Rel-13 MTC," 3GPP TSG RAN WG1 Meeting #80, Athens, Greece, Feb. 9-13, 2015, R1-150286, 4 pages, Retrieved from the Internet: URL:http://www.3gpp.org/ftp/tsg_ran/WG1_RL1/TSGR1_80/Docs/. Copy submitted in parent U.S. Appl. No. 15/564,872.

Nokia Networks, "Frequency Hopping for UEs in Coverage Enhancement," 3GPP TSG RAB WG1 Meeting #80 bis, Belgrade, Serbia, Apr. 20-24, 2015, R1-151308, 3 pages. Retrieved from the Internet: URL:http://www.3gpp.org/ftp/Meetings_3GPP_SYNC/RAN1/Docs/. Copy submitted in parent U.S. Appl. No. 15/564,872.

International Search Report & Written Opinion dated Jul. 21, 2015 corresponding to International Patent Application No. PCT/US2015/025138. Copy submitted in parent U.S. Appl. No. 15/564,872.

FREQUENCY HOPPING METHOD FOR MACHINE TYPE COMMUNICATION

CROSS REFERENCE TO RELATED APPLICATION

This is a Continuation of U.S. patent application Ser. No. 15/564,872 filed on Oct. 6, 2017 which is a 371 Application of International Patent Application No. PCT/US2015/025138 filed Apr. 9, 2015, the contents of these applications are hereby incorporated by reference.

BACKGROUND

Field

Embodiments of the present invention relate to a frequency hopping method for machine type communication.

Description of the Related Art

Machine type communication (MTC) is wireless communication that seeks to communicate with devices by using new modulation/signal processing techniques. MTC has been described by the $3^{rd}$ Generation Partnership Project (3GPP), and is based upon previous network technologies. Since its inception, MTC has seen extensive deployment in a wide variety of contexts involving the communication of data.

SUMMARY

According to a first embodiment, a method may include receiving, by a machine type communication user equipment, parameters for frequency hopping in downlink or uplink. The parameters may include an "X," "Y," and "Z" parameters. "X" corresponds to a duration for which the same physical resource blocks are used for transmission. "Y" corresponds to a frequency hopping period. "Z" corresponds to a frequency hopping pattern indication. The method may also include performing frequency hopping in accordance with the parameters.

In the method of the first embodiment, the one or more parameters for frequency hopping are broadcast, configured via radio resource control signaling or configured via Layer 1 (L1) signaling.

In the method of the first embodiment, "X" and "Y" are based on physical downlink shared channel or machine type communication downlink control channel or physical uplink shared channel or physical random access channel repetition levels.

In the method of the first embodiment, "Y" is based on a channel estimation filter length.

In the method of the first embodiment, "Y" corresponds to ceiling (K/n), "K" corresponds to a number of repetitions, "n" is an integer greater than or equal to 2, and "n" is the number of hops in one data transmission configured by an evolved Node B.

In the method of the first embodiment, the values of "X" and "Y" are the same for all repetition levels. The number of hops is determined according to the repetition number of the related repetition level and "Y".

In the method of the first embodiment, "X" corresponds to Y−1.

In the method of the first embodiment, "Z" is based on an offset or a predefined pattern for physical downlink shared channel or machine type communication downlink control channel or physical uplink shared channel or physical random access channel frequency hopping.

In the method of the first embodiment, the predefined pattern includes half-bandwidth frequency hopping or one-fourth-bandwidth frequency hopping.

In the method of the first embodiment, "Z" is the index of a pattern of pre-defined PRB blocks, where 6 PRBs constitute a PRB block, for physical downlink shared channel or physical uplink shared channel frequency hopping.

In the method of the first embodiment, "Z" is the index of any consecutive 6 PRBs, for physical downlink shared channel or physical uplink shared channel frequency hopping.

In the method of the first embodiment, the position of frequency hopping is indicated by DCI, where additional bits provide the information of the position of the 6 PRBs for each hop.

In the method of the first embodiment, "Z" is indicated by higher layer signaling, more specifically, "Z" is indicated for the physical downlink shared channel and physical uplink shared channel by the frequency hopping configuration for the respective channel, and indicated by the frequency hopping configuration in the random access response for the machine type communication downlink control channel.

According to a second embodiment, an apparatus may include at least one processor. The apparatus may also include at least one memory including computer program code. The at least one memory and the computer program code may be configured, with the at least one processor, to cause the apparatus at least to receive parameters for frequency hopping in downlink or uplink. The parameters comprise an "X," "Y," and "Z" parameters. "X" corresponds to a duration for which the same physical resource blocks are used for transmission. "Y" corresponds to a frequency hopping period. "Z" corresponds to a frequency hopping pattern indication. The apparatus may also be caused to perform frequency hopping in accordance with the parameters.

In the apparatus of the second embodiment, the one or more parameters for frequency hopping are broadcast, configured via radio resource control signaling or configured via Layer 1 (L1) signaling.

In the apparatus of the second embodiment, "X" and "Y" are based on physical downlink shared channel or machine type communication downlink control channel or physical uplink shared channel or physical random access channel repetition levels.

In the apparatus of the second embodiment, "Y" is based on a channel estimation filter length.

In the apparatus of the second embodiment, "Y" corresponds to ceiling (K/n). "K" corresponds to a number of repetitions. "n" is an integer greater than or equal to 2, and "n" is the number of hops in one data transmission configured by an evolved Node B.

In the apparatus of the second embodiment, the values of "X" and "Y" are the same for all repetition levels. The number of hops is determined according to the repetition number of the related repetition level and "Y".

In the apparatus of the second embodiment, "X" corresponds to Y−1.

In the apparatus of the second embodiment, "Z" is based on an offset or a predefined pattern for physical downlink shared channel or machine type communication downlink control channel or physical uplink shared channel or physical random access channel frequency hopping.

In the apparatus of the second embodiment, the predefined pattern includes half-bandwidth frequency hopping or one-fourth-bandwidth frequency hopping.

In the apparatus of the second embodiment, "Z" is the index of a pattern of pre-defined PRB blocks, where 6 PRBs constitute a PRB block, for physical downlink shared channel or physical uplink shared channel frequency hopping.

In the apparatus of the second embodiment, "Z" is the index of any consecutive 6 PRBs, for physical downlink shared channel or physical uplink shared channel frequency hopping.

In the apparatus of the second embodiment, the position of frequency hopping is indicated by DCI, where additional bits provide the information of the position of the 6 PRBs for each hop.

In the apparatus of the second embodiment, "Z" is indicated by higher layer signaling, more specifically, "Z" is indicated for the physical downlink shared channel and physical uplink shared channel by the frequency hopping configuration for the respective channel, and indicated by the frequency hopping configuration in the random access response for the MTC downlink control channel.

According to a third embodiment, a computer program product may be embodied on a non-transitory computer readable medium. The computer program product may be configured to control a processor to perform a process, including receiving, by a machine type communication user equipment, parameters for frequency hopping in downlink and uplink. The parameters may include an "X," "Y," and "Z" parameters. "X" corresponds to a duration for which the same physical resource blocks are used for transmission. "Y" corresponds to a frequency hopping period. "Z" corresponds to a frequency hopping pattern indication. The process may also include performing frequency hopping in accordance with the parameters.

In the computer program product of the third embodiment, the one or more parameters for frequency hopping are broadcast, configured via radio resource control signaling or configured via Layer 1 (L1) signaling.

In the computer program product of the third embodiment, "X" and "Y" are based on physical downlink shared channel or machine type communication downlink control channel or physical uplink shared channel or physical random access channel repetition levels.

In the computer program product of the third embodiment, "Y" is based on a channel estimation filter length.

In the computer program product of the third embodiment, "Y" corresponds to ceiling (K/n). "K" corresponds to a number of repetitions. "n" is an integer greater than or equal to 2, and "n" is the number of hops in one data transmission configured by an evolved Node B.

In the computer program product of the third embodiment, the values of "X" and "Y" are the same for all repetition levels, the number of hops is determined according to the repetition number of the related repetition level and "Y".

In the computer program product of the third embodiment, "X" corresponds to Y−1.

In the computer program product of the third embodiment, "Z" is based on an offset or a predefined pattern for physical downlink shared channel or machine type communication downlink control channel or physical uplink shared channel or physical random access channel frequency hopping.

In the computer program product of the third embodiment, the predefined pattern includes half-bandwidth frequency hopping or one-fourth-bandwidth frequency hopping.

In the computer program product of the third embodiment, "Z" is the index of a pattern of pre-defined PRB blocks, where 6 PRBs constitute a PRB block, for physical downlink shared channel or physical uplink shared channel frequency hopping.

In the computer program product of the third embodiment, "Z" is the index of any consecutive 6 PRBs, for physical downlink shared channel or physical uplink shared channel frequency hopping.

In the computer program product of the third embodiment, the position of frequency hopping is indicated by DCI, where additional bits provide the information of the position of the 6 PRBs for each hop.

In the computer program product of the third embodiment, "Z" is indicated by higher layer signaling, more specifically, "Z" is indicated for the physical downlink shared channel and physical uplink shared channel by the frequency hopping configuration for the respective channel, and indicated by the frequency hopping configuration in the random access response for the MTC downlink control channel.

BRIEF DESCRIPTION OF THE DRAWINGS

For proper understanding of the invention, reference should be made to the accompanying drawings, wherein.

DETAILED DESCRIPTION

Figure 1:
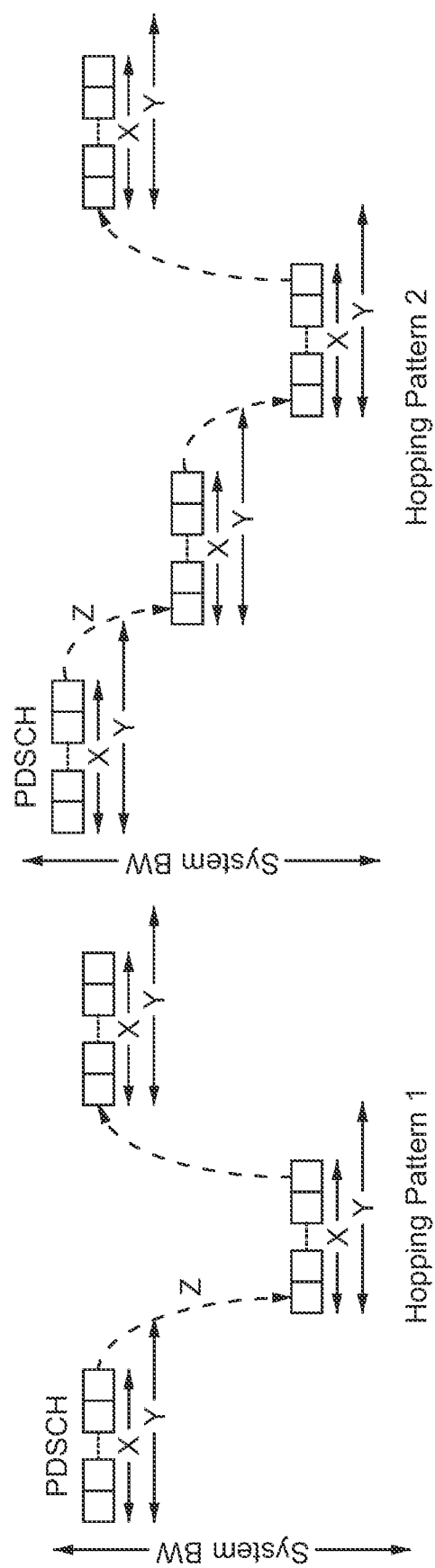
FIG. 1 illustrates a frequency hopping frequency and configuration.

Certain embodiments of the present invention relate to a frequency hopping method for machine type communication. Certain embodiments of the present invention relate to the 3GPP Release 13 Work Item entitled "Further LTE Physical Layer Enhancements for MTC." One of the objectives of certain embodiments is to improve coverage enhancement. Another objective may be to implement related techniques such as frequency hopping, for example.

In RAN1 #79meeting, it was agreed that Release 13 low-cost machine type communications (MTC) user equipment (UE) can only transmit and receive data in a narrow bandwidth (such as a bandwidth of 6 physical resource blocks (PRBs), for example).

As shown by contribution R1-150255, for the event timer unit channel 1 (ETU1 channel), the gain from hopping is negligible at a 10% block error rate (BLER) point. At the 1% BLER point, there is a gain of up to 1 dB. Such a gain may result in up to a 25% reduction in the number of required repetitions for this channel.

Hence, frequency hopping may be a promising technique for further consideration. For improvement of physical uplink shared channel coverage, R1-150254 has provided a similar observation. R1-150254 has described the following: "Observation 2: For PUSCH, cross-subframe channel estimation reduces the number of required repetitions significantly. At high coverage enhancement level, increased DMRS density and PSD boosting below 1 PRB can also reduce the number of required repetitions significantly. Frequency hopping is also promising techniques but requires further study." As such, frequency hopping may be a promising technique for enhancing coverage for physical uplink shared channel (PUSCH) and for physical downlink shared channel (PDSCH).

In RAN1 #80meeting, the following agreements were reached, as described below. PDSCH and PUSCH frequency hopping will be supported when MTC user equipment (UE) is located in enhanced coverage. With regard to the reached agreements, for Release 13 low complexity UE in enhanced coverage, the following techniques that are related to, at least, unicast PDSCH should be supported.

In order to allow cross-subframe channel estimation, the scheduled PRB is in the same (frequency domain) position during at least X subframes. Assuming that the channel does not vary significantly during those X subframes, the channel for that PRB can be estimated by using reference symbols in all X subframes with the help of an appropriate filter. The value of "X" and the configuration are intended to be studied further. Having the PRB position as the same for X subframes does not preclude discontinuous transmission for unicast PDSCH.

Frequency hopping is supported over the system bandwidth (BW). If/when frequency hopping is applied, a frequency location should be switched after every Y consecutive subframes, where Y is equal to or larger than X, assuming that a re-tuning time is included in Y. Configurability is intended to be studied further.

With regard to other agreements that are reached, for physical channel(s) carrying UL data repetition (including different redundancy versions (RVs)) for Release 13 low complexity MTC UEs with a coverage enhancement mode, a variety of techniques are supported. For example, the following techniques are supported: (1) Cross-subframe channel estimation, and/or (2) Frequency hopping over system bandwidth across subframes. The network can enable or disable the hopping. The details of configuration are intended to be studied further.

It was agreed that Release 13 low cost MTC UE can only transmit and receive data in a narrow bandwidth (such as a bandwidth of 6 PRBs, for example). Considering the agreements of RAN1 #80meeting, PDSCH and PUSCH for MTC could change the frequency domain location in different subframes. Several issues related to frequency hopping may need to be addressed. For example, frequency hopping patterns for UL and DL physical channels may need to be addressed. Frequency hopping configurations in UL and DL may need to be addressed.

Based on the RAN1 #80agreements, frequency hopping patterns and configurations can be described by three parameters as illustrated by FIG. 1. FIG. 1 illustrates a frequency hopping frequency and configuration.

The parameters are described as follows. "X" may correspond to a duration of same PRB position (to enable cross-subframe channel estimation), and the unit of measurement may be a subframe. "Y" may correspond to a frequency hopping period (equal to or greater than X, including a re-tuning time), and the unit of measurement may be a subframe. "Z" may correspond to a frequency hopping pattern indication.

Certain embodiments of the present invention may be directed to the configuration of (X, Y, Z) parameters for frequency hopping in DL and UL.

With respect to X & Y configuration, X and Y are based on the Enhanced-Physical-Downlink-Control-Channel/ Physical-Downlink-Shared-Channel or Physical-Uplink-Shared-Channel/Physical-Random-Access-Channel repetition level, or based on a coverage enhancement level in UL and DL. The repetition level is configured by the eNB and each transmission is repeated a pre-defined number of times for each repetition level. The maximum values of X and Y should be less than the number of repetitions configured for the UE.

Y depends on a channel estimation filter length to allow UE to start cross-subframe channel estimation prior to PDSCH/PUSCH transmission by the eNB. Cross-subframe channel estimation also depends on the phase continuity at the eNB/UE. So, in one embodiment, Y can depend on the assumed phase continuity at the eNB/UE. In one embodiment, Y=ceiling(K/n), where K=number of repetition, and "n" is an integer greater than or equal to 2. "n" is a parameter configured by the eNB. There may be one parameter "n" that can be used to calculate X and Y, regardless of the repetition level. In other words, if MTC knows the repetition numbers of all repetition levels, the X and Y will update automatically if a repetition level is adjusted. This is more suitable for the case that frequency hopping pattern is indicated by DCI.

With a second embodiment for X and Y configuration, the values of X and Y are the same for all repetition levels and, with the information of configured maximum repetition number for the repetition level, an MTC UE can derive the number of frequency hops via dividing the repetition number by Y. If repetition level adaptation is allowed, the eNB needs to inform the UE the repetition numbers corresponding to all repetition levels; therefore, UE could simply adjust the number of frequency hops when the repetition level is updated, in case the half-system-bandwidth frequency hopping pattern is applied The value of X may correspond to Y−1, for example, when the re-tuning time does not exceed a subframe duration. In another embodiment, the initial X and Y are based on a preamble repetition level that is used in a random access procedure. During an initial system access, the preamble repetition level is used as a starting point for a UE coverage enhancement level.

With respect to Hopping Pattern Z, with a first embodiment, when an eNB schedules a coverage enhancement MTC UE, the UE can be scheduled in any continuous 6 PRBs.

In DL, frequency hopping of enhanced physical downlink control channel (EPDCCH) and PDSCH is implemented by switching a fixed frequency position, for example, switching by half of the system bandwidth or one-fourth of the system bandwidth. More specifically, for half-bandwidth frequency hopping, the PRB position after frequency hopping is determined by adding a half-system-bandwidth with the PRB position prior to the hopping and wrapping around to remain inside the system bandwidth.

$$n_{PRB\ hopping} = \begin{cases} (n_{first\ PRB} + N_{RB}^{DL}/2) \cdot & \text{if } (n_{first\ PRB} + N_{RB}^{DL}/2) \cdot \\ \quad \text{mod } N_{RB}^{DL} & \quad \text{mod } N_{RB}^{DL} \leq N_{RB}^{DL} - 6 \\ (n_{first\ PRB} + N_{RB}^{DL}/2) \cdot & \text{if } N_{RB}^{DL} - 6 < (n_{first\ PRB} + N_{RB}^{DL}/2) \cdot \\ \quad \text{mod } N_{RB}^{DL} - 3 & \quad \text{mod } N_{RB}^{DL} \leq N_{RB}^{DL} - 3 \\ n_{first\ PRB} + N_{RB}^{DL}/2) \cdot & \text{if } N_{RB}^{DL} - 3 < (n_{first\ PRB} + N_{RB}^{DL}/2) \cdot \\ \quad \text{mod } N_{RB}^{DL} + 3 & \quad \text{mod } N_{RB}^{DL} \leq N_{RB}^{DL} \end{cases}$$

$N_{RB}^{DL}$ is a system bandwidth, expressed in multiple of PRB. $n_{first\ PRB}$ is the first PRB index of a continuous 6 PRBs before the frequency hopping. $n_{PRB\ hopping}$ is the first PRB index of a continuous 6 PRBs after the frequency hopping.

In UL, the PUSCH or physical random access channel (PRACH) frequency hopping is similar to PDSCH frequency hopping, and only the PRBs allocated to PUCCH are precluded from system bandwidth to avoid collision with PUCCH PRBs.

The frequency hopping pattern can be determined as $$n_{PRB\ hopping} = \begin{cases} (n_{first\ PRB} + N_{RB}^{DL}/2 - N_{RB}^{PUCCH}) \cdot \\ \quad \mod(N_{RB}^{DL} - 2 \cdot N_{RB}^{PUCCH}) \end{cases} \quad \begin{array}{l} \text{if } (n_{first\ PRB} + N_{RB}^{DL}/2 - N_{RB}^{PUCCH}) \cdot \\ \mod(N_{RB}^{DL} - 2 \cdot N_{RB}^{PUCCH}) - 3 \leq \\ N_{RB}^{DL} - 2 \cdot N_{RB}^{PUCCH} - 6 \end{array}$$

$$\begin{cases} (n_{first\ PRB} + N_{RB}^{DL}/2 - N_{RB}^{PUCCH}) \cdot \\ \quad \mod(N_{RB}^{DL} - 2 \cdot N_{RB}^{PUCCH}) - 3 \end{cases} \quad \begin{array}{l} \text{if } N_{RB}^{DL} - 2 \cdot N_{RB}^{PUCCH} - 6 < \\ (n_{first\ PRB} + N_{RB}^{DL}/2 - N_{RB}^{PUCCH}) \cdot \\ \mod(N_{RB}^{DL} - 2 \cdot N_{RB}^{PUCCH}) - 3 \leq \\ N_{RB}^{DL} - 2 \cdot N_{RB}^{PUCCH} - 3 \end{array}$$

$$\begin{cases} (n_{first\ PRB} + N_{RB}^{DL}/2 - N_{RB}^{PUCCH}) \cdot \\ \quad \mod(N_{RB}^{DL} - 2 \cdot N_{RB}^{PUCCH}) + 3 \end{cases} \quad \text{else}$$

$N_{RB}^{PUCCH}$ are the PRB numbers allocated for PUCCH transmission in half of the system bandwidth.

Frequency hopping of EPDCCH, PDSCH, and PUSCH can be configured separately by higher layer signaling. The frequency location of physical channels can be switched several times according to the configured repetition level. Enabling of frequency hopping can be indicated by higher layer signaling, such as by Random Access Response (RAR) or by physical layer signaling. For example, enabling of frequency hopping can be signaled by, for example, 1 bit in downlink control information (DCI). For PRACH, frequency-hopping-related information is embedded in the PRACH configuration, including whether frequency hopping is enabled or not, X or Y value indication, and frequency hopping pattern indication such as half-system bandwidth frequency hopping or one-fourth bandwidth frequency hopping. The PUCCH PRBs are excluded from the system bandwidth. Some potential specification impacts on TS36.331 are shown below. Here, it is assumed that the number of repetitions for each repetition level is already defined.

| PRACH-Config information elements | |
|---|---|
| -- ASN1START | |
| PRACH-ConfigSIB ::= | SEQUENCE { |
|   rootSequenceIndex | INTEGER (0..837), |
|   prach-ConfigInfo | PRACH-ConfigInfo |
| } | |
| PRACH-Config ::= | SEQUENCE { |
|   rootSequenceIndex | INTEGER (0..837), |
|   prach-ConfigInfo | PRACH-ConfigInfo |
|   OPTIONAL | -- Need ON |
| } | |
| PRACH-ConfigInfo ::= | SEQUENCE { |
|   prach-ConfigIndex | INTEGER (0..63), |
|   highSpeedFlag | BOOLEAN, |
|   zeroCorrelationZoneConfig | INTEGER (0..15), |
|   prach-FreqOffset | INTEGER (0..94) |
|   frequency hopping enabling | BOOLEAN |
|   frquency hopping period | INTERGER (0..63) |

| PRACH-Config information elements |  |
|---|---|
|   frquency hopping pattern | INTERGER (0,1) |
| } | |
| } | |
| -- ASN1STOP | |

The pattern may also include an offset that depends on a physical cell ID (PCI) to randomize inter-cell interference.

With a second embodiment, a MTC UE can only be scheduled within predefined 6-PRB regions, according to the system bandwidth. The UL or DL PRB(s) position (after each frequency hopping) is signaled in DCI carried by EPDCCH (when scheduling PDSCH or PUSCH). Alternatively, the frequency hopping information can be carried by higher layer signaling with PDSCH or PUSCH configuration. The frequency hopping information may include the initial 6 PRBs position and duration, the 6 PRBs position in a first frequency hopping and duration, and so on. For EPDCCH frequency hopping, the PRB(s) position indication can be configured for the UE, in terms of the operating 6-PRB allocation, by higher layer signaling, such as RAR signaling.

With a third embodiment, MTC UE can be scheduled in any continuous 6 PRBs in the system bandwidth. The UL or DL PRB(s) position after frequency hopping is signaled in DCI carried by EPDCCH (scheduling PDSCH or PUSCH). Alternatively, the frequency hopping information can be carried by higher layer signaling with PDSCH or PUSCH configuration, such as the initial 6 PRBs position and duration, 6 PRBs position in first frequency hopping and duration, and so on. For EPDCCH frequency hopping, the PRB position indication can be configured for the UE, in terms of the operating 6-PRB allocation, by higher layer signaling such as RAR signaling.

Further, with certain embodiments of the present invention, when hopping is applied on one link (DL or UL), the same pattern is also simultaneously applied on the other link. In case UE needs to maintain the same Tx-Rx separation, certain embodiments may synchronize hopping.

Certain embodiments of the present invention implement UL and DL frequency hopping for low cost MTC in coverage mode.

With respect to X & Y Configuration, configuration of X & Y may be straightforward.

In one embodiment, X and Y may be based on a EPDCCH/PDSCH repetition level, a PUSCH/PRACH repetition level, or based on a configured coverage enhancement level in UL and DL. In another embodiment, X and Y are separately configured for EPDCCH, PDSCH, PUSCH, and PRACH.

In another embodiment, X and Y can either be semi-statically configured, dynamically assigned, and/or derived from another transmission. For example, X & Y for Msg3 transmission can be derived from the number of PRACH repetitions.

In another embodiment, X and Y are dependent on the type of transmission. For example, X & Y could be different for a RAR, Paging, unicast, System Information Block (SIB), or broadcast channel.

In another embodiment, Y=ceiling(K/n), where K=number of repetitions, and n is an integer greater than or equal to 2 (that is configured by eNB).

One parameter "n" can be specified that can be used to calculate X and Y, regardless of the repetition level. In other words, the X and Y values may update automatically if the repetition level is adjusted.

With respect to Hopping Pattern Z, in one embodiment, frequency hopping is based on an offset or a predefined pattern. In another embodiment, the offset is based on the system bandwidth, is provided in the DCI, is based on a physical cell ID, and/or is configured via higher layer signaling.

In another embodiment, the predefined pattern may be based on a system bandwidth or a physical cell ID, and the hopping information may be configured via higher layer signaling.

In one embodiment, when hopping is applied on one link (DL or UL), the same pattern is also simultaneously applied on the other link.

With a first embodiment, the MTC UE can be scheduled in any 6 continuous PRBs by eNB, if frequency hopping is enabled. After repeated transmission with a predefined number of repetitions in the same 6 PRBs, the MTC UE may transmit or receive in another 6 PRBs. The frequency location may be shifted by half the system bandwidth. For instance, if the system bandwidth is 100 PRBs and the PDSCH is initially transmitted in PRB #5-12, then after the frequency hopping, the PDSCH will be transmitted in PRB #55-62. Also, frequency hopping can be performed several times according to a repetition level. Then, after another frequency hopping, the PDSCH will be transmitted again in PRB #5-12.

Figure 2:
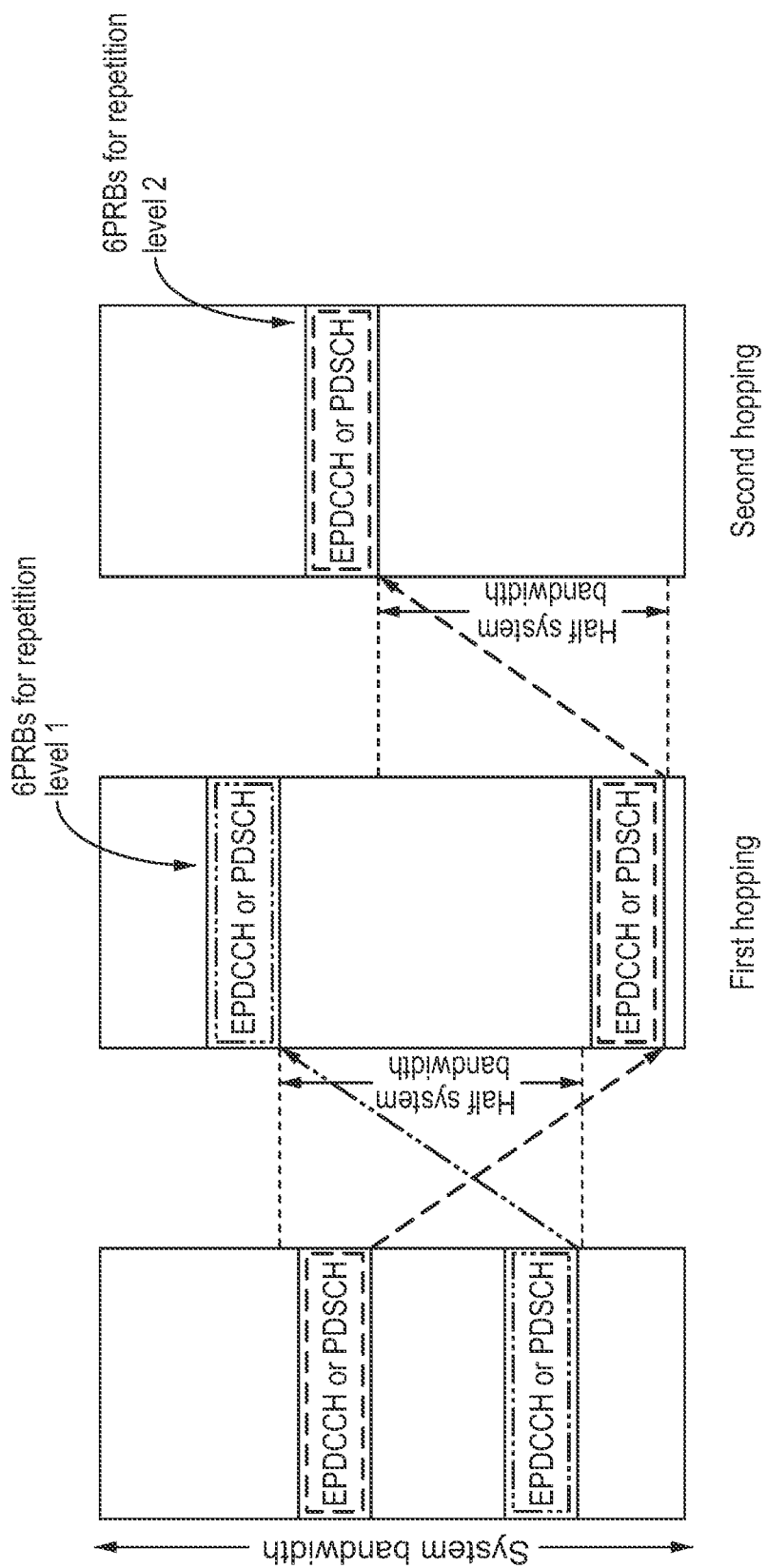
FIG. 2 illustrates frequency hopping with half-system bandwidth.

FIG. 2 illustrates frequency hopping with a half-system-bandwidth. As illustrated by FIG. 2, with repetition level 2, frequency hopping is performed twice. Also according to these embodiments, the frequency hopping configuration can be different for different MTC UEs.

With this embodiment, different MTC UEs (or UEs in different repetition levels) could get the most of the frequency diversity gains. It may be easier for MTC UE implementation.

With a second embodiment of the present invention, the available 6 PRBs for MTC UE is determined according to the center 6 PRBs. The central 6 PRBs may be used for PBCH/SIB/Paging reception, and the 6 PRBs allocated to MTC UE are not overlapped with the center 6 PRBs. If the system bandwidth is 20 MHz (corresponding to 100 PRBs, for example), each half of the bandwidth could have 47 PRBs available for MTC usage. 7×6 PRBs can be allocated to MTC UEs, and 5 PRBs may not be used within the half-bandwidth. So, there are a total of 15 (7+1+7) PRB blocks for MTC usage. With these embodiments, 4 bits are needed to indicate the frequency location of 6 PRBs for each hopping. The 4× m bits of hopping information can be included in DCI (carried by EPDCCH), where m is the number of hops for one data transmission. If frequency hopping information is accompanying an indication of MTC operating PRBs, the hopping information could comprise {initial 6 PRBs position, 6 PRBs position in first hopping, 6 PRBs position in second hopping . . . }. In another way, the 6-PRB allocation does not depend on isolating the central 6 PRBs; for example, if 6 PRBs constitute a PRB block, there are at most 16 PRB blocks available for MTC usage, and again 4 bits are needed in DCI for each frequency hopping.

Figure 3:
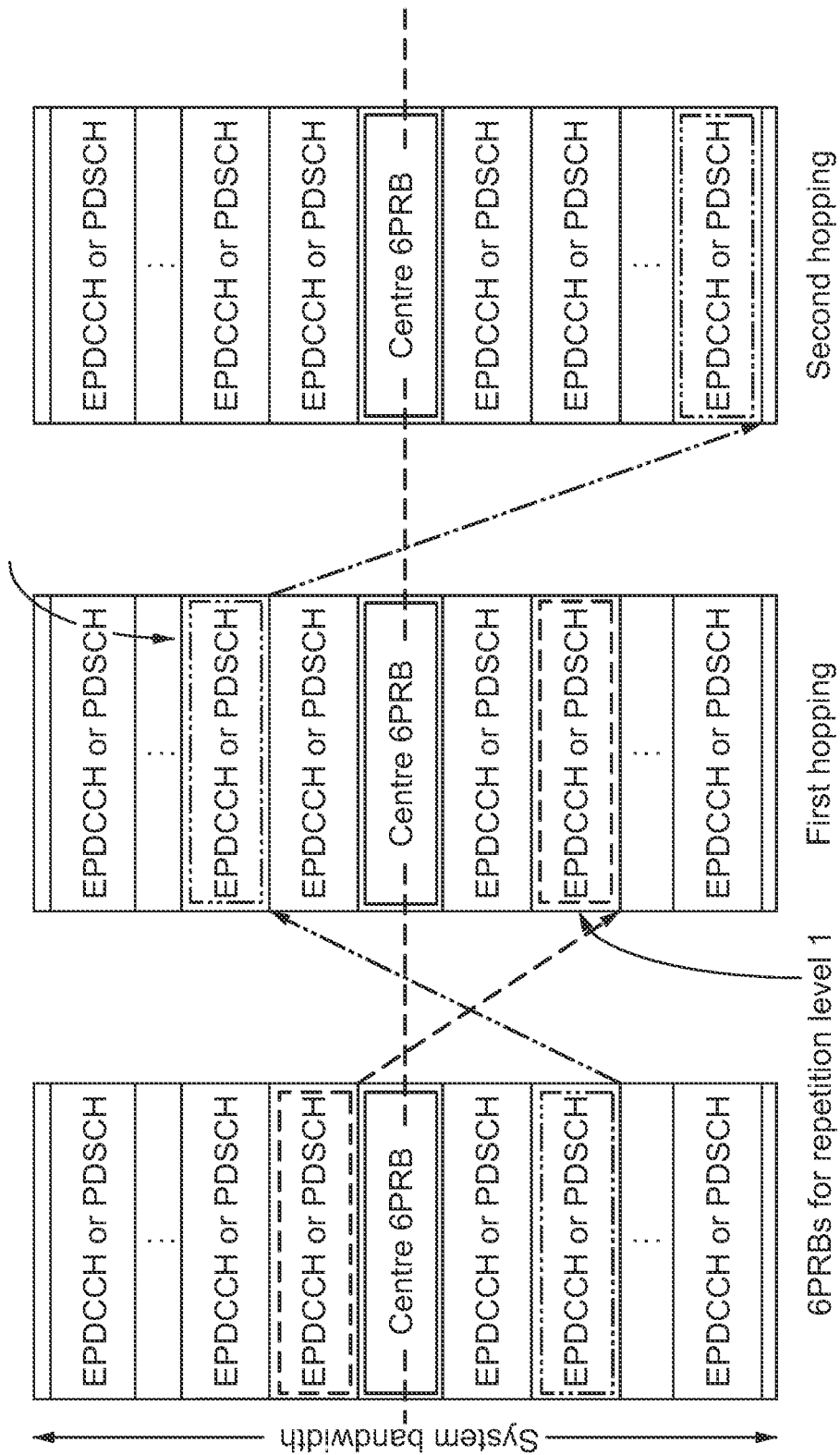
FIG. 3 illustrates frequency hopping with a physical resource blocks (PRBs) pattern.

For this embodiment, the frequency position for each hopping in one data transmission can be flexibly determined by the eNB. However, the available PRBs for MTC usage are less than the first embodiment and more DCI bits are required for frequency hopping. The illustration of a second embodiment is illustrated by FIG. 3. FIG. 3 illustrates frequency hopping with a PRBs pattern.

With a third embodiment, there may be no PRBs allocation restrictions for MTC, the first PRB index of the allocated PRB block can be flexibly configured by the eNB. However, more bits in DCI are required to indicate the PRB position after the hopping. The eNB has more flexibility to scheduling MTC UE and hopping. But, with an increase in MTC devices, the eNB scheduling could get more complex and the frequency diversity gain will decrease.

For the frequency hopping period and duration determination, certain embodiments of the present invention may be robust and automatically adapted to implicitly update a repetition level, and additional Radio Resource Control (RRC) signaling may not be required.

For the frequency hopping patterns, the first embodiment has little impact on standards, while most of frequency diversity gains can be achieved.

The second embodiment may allow the eNB to have more flexibility to configure the frequency position location. The cost could be an increase in DCI size, and the EPDCCH transmission may need more repetition.

The third embodiment may be more flexible than the second embodiment, but the third embodiment may need to add more bits in DCI.

Figure 4:
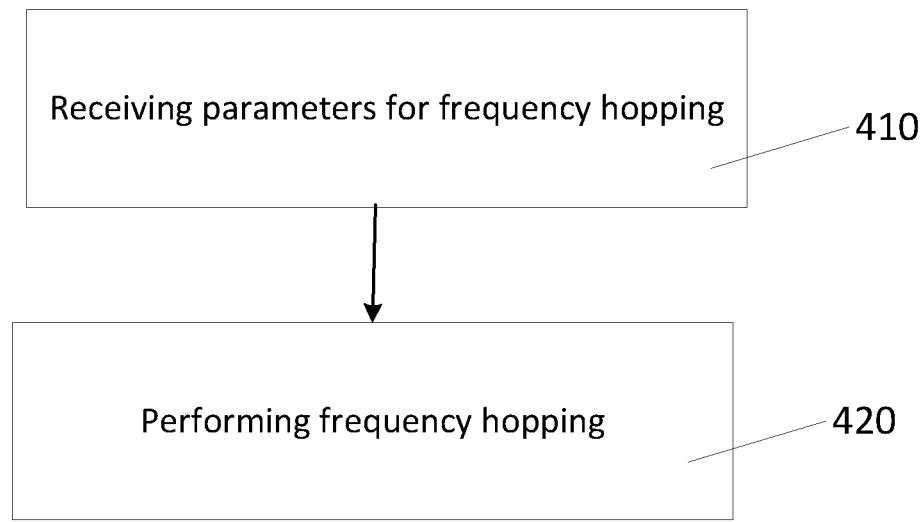
FIG. 4 illustrates a flowchart of a method in accordance with certain embodiments of the invention.

FIG. 4 illustrates a flowchart of a method in accordance with certain embodiments of the invention. The method illustrated in FIG. 4 includes, at 410, receiving, by a machine type communication user equipment, parameters for frequency hopping in downlink or uplink. The parameters comprise an "X," "Y," and "Z" parameters. "X" corresponds to a duration for which the same physical resource blocks are used for transmission. "Y" corresponds to a frequency hopping period, and "Z" corresponds to a frequency hopping pattern indication. The method may also include, at 420, performing frequency hopping in accordance with the parameters.

Figure 5:
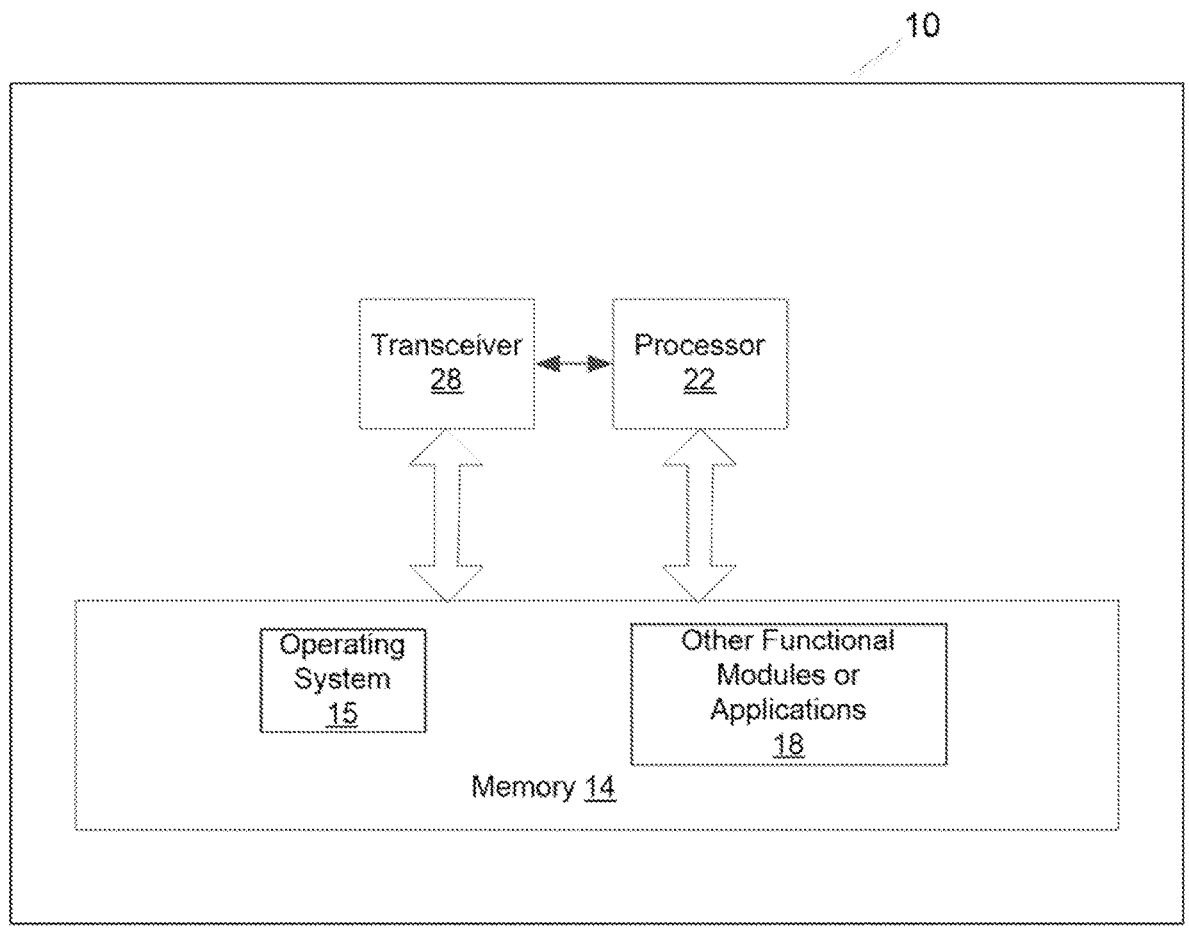
FIG. 5 illustrates an apparatus in accordance with certain embodiments of the invention.

FIG. 5 illustrates an apparatus in accordance with certain embodiments of the invention. In one embodiment, the apparatus can be a user equipment, a base station, and/or a MTC device, for example. The apparatus can be a network node. Apparatus 10 can include a processor 22 for processing information and executing instructions or operations. Processor 22 can be any type of general or specific purpose processor. While a single processor 22 is shown in FIG. 5, multiple processors can be utilized according to other embodiments. Processor 22 can also include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 can further include a memory 14, coupled to processor 22, for storing information and instructions that can be executed by processor 22. Memory 14 can be one or more memories and of any type suitable to the local application environment, and can be implemented using any suitable volatile or nonvolatile data storage technology such as a semiconductor-based memory device, a magnetic memory device and system, an optical memory device and system, fixed memory, and removable memory. For example, memory 14 include any combination of random access memory (RAM), read only memory (ROM), static storage such as a magnetic or optical disk, or any other type of non-transitory machine or computer readable media. The instructions stored in memory 14 can include program instructions or computer program code that, when executed by processor 22, enable the apparatus 10 to perform tasks as described herein.

Apparatus 10 can also include one or more antennas (not shown) for transmitting and receiving signals and/or data to and from apparatus 10. Apparatus 10 can further include a transceiver 28 that modulates information on to a carrier waveform for transmission by the antenna(s) and demodulates information received via the antenna(s) for further processing by other elements of apparatus 10. In other embodiments, transceiver 28 can be capable of transmitting and receiving signals or data directly.

Processor 22 can perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

For example, apparatus 10 may receive parameters for frequency hopping in downlink or uplink. The parameters may include an "X," "Y," and "Z" parameters. "X" may correspond to a duration for which the same physical resource blocks are used for transmission. "Y" may correspond to a frequency hopping period. "Z" may correspond to a frequency hopping pattern indication. Apparatus 10 may also perform frequency hopping in accordance with the parameters.

In an embodiment, memory 14 can store software modules that provide functionality when executed by processor 22. The modules can include an operating system 15 that provides operating system functionality for apparatus 10. The memory can also store one or more functional modules 18, such as an application or program, to provide additional functionality for apparatus 10. The components of apparatus 10 can be implemented in hardware, or as any suitable combination of hardware and software.

Figure 6:
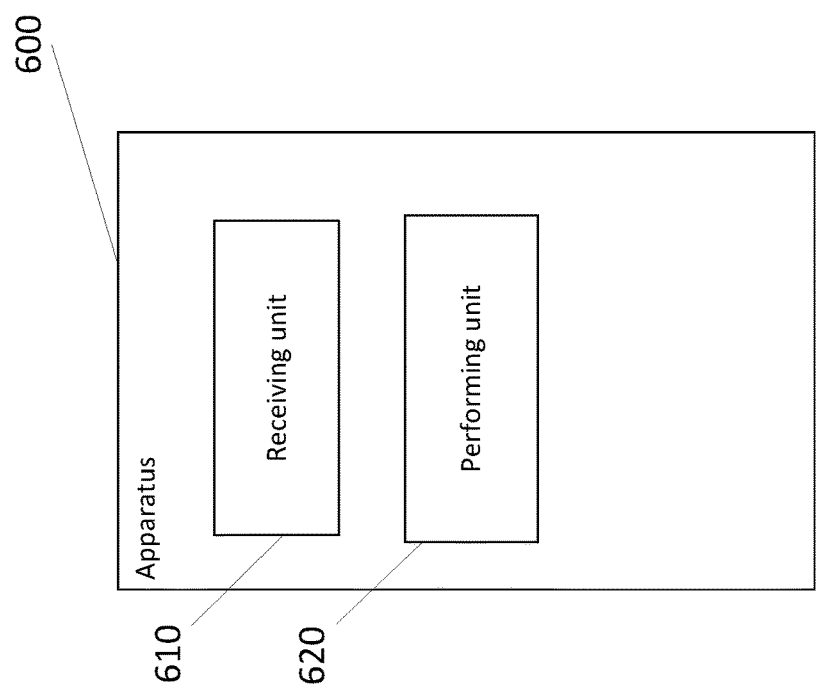
FIG. 6 illustrates an apparatus in accordance with certain embodiments of the invention.

FIG. 6 illustrates an apparatus in accordance with certain embodiments of the invention. Apparatus 600 can be a network element/entity such as a user equipment, for example. Apparatus 600 can include a receiving unit 610 that receives, by a machine type communication user equipment, parameters for frequency hopping in downlink or uplink, wherein the parameters comprise an "X," "Y," and "Z" parameters, "X" corresponds to a duration for which the same physical resource blocks are used for transmission. "Y" corresponds to a frequency hopping period, and "Z" corresponds to a frequency hopping pattern indication. Apparatus 600 can also include a performing unit 620 that performs frequency hopping in accordance with the parameters.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
receiving, by a machine type communication user equipment, parameters for frequency hopping in downlink or uplink, wherein the parameters comprise "X," "Y," and "Z" parameters, "X" corresponds to a duration for which the same physical resource blocks (PRBs) are used for transmission, "Y" corresponds to a frequency hopping period according to a predetermined number of repetitions and a predetermined number of hops in one data transmission configured by an evolved Node B, and "Z" corresponds to a frequency hopping pattern indication; and
performing frequency hopping in accordance with the parameters,
wherein "X" and "Y" are based on physical downlink shared channel or machine type communication downlink control channel or physical uplink shared channel or physical random access channel repetition levels, and
wherein the one or more parameters for frequency hopping are configured via radio resource control (RRC) signaling comprising at least one RRC information element indicating at least one maximum number of repetitions and at least one RRC information element indicating at least one offset.

2. The method according to claim 1, wherein "Y" is based on a channel estimation filter length.

3. The method according to claim 1, wherein "Y" corresponds to ceiling (K/n), "K" corresponds to a number of repetitions, "n" is an integer greater than or equal to 2, and "n" is the number of hops in one data transmission configured by an evolved Node B.

4. The method according to claim 1, wherein the values of "X" and "Y" are the same for all repetition levels, and the number of hops is determined according to the repetition number of the related repetition level and "Y".

5. The method according to claim 1, wherein "X" corresponds to Y−1.

6. The method according to claim 1, wherein "Z" is based on an offset or a predefined pattern for physical downlink shared channel or machine type communication downlink control channel or physical uplink shared channel or physical random access channel frequency hopping.

7. The method according to claim 6, wherein the predefined pattern includes half-bandwidth frequency hopping or one-fourth-bandwidth frequency hopping.

8. The method according to claim 1, wherein "Z" comprises an index of a pattern of pre-defined PRBs, where 6 PRBs constitute a PRB block, for physical downlink shared channel or physical uplink shared channel frequency hopping.

9. The method according to claim 8, wherein a position of frequency hopping is indicated by downlink control information (DCI), where additional bits provide the information of the position of the 6 PRBs for each hop.

10. The method according to claim 1, wherein "Z" comprises an index of any consecutive 6 PRBs, for physical downlink shared channel or physical uplink shared channel frequency hopping.

11. The method according to claim 1, wherein "Z" is indicated by higher layer signaling, "Z" is indicated for the physical downlink shared channel and physical uplink shared channel by the frequency hopping configuration for the respective channel, and indicated by the frequency hopping configuration in the random access response for the machine type communication downlink control channel.

12. An apparatus, comprising:
at least one processor; and
at least one memory including computer program code,
the at least one memory and the computer program code configured, with the at least one processor, to cause the apparatus at least to:
receive parameters for frequency hopping in downlink or uplink, wherein the parameters comprise "X," "Y," and "Z" parameters, "X" corresponds to a duration for which the same physical resource blocks (PRBs) are used for transmission, "Y" corresponds to a frequency hopping period according to a predetermined number of repetitions and a predetermined number of hops in one data transmission configured by an evolved Node B, and "Z" corresponds to a frequency hopping pattern indication; and
perform frequency hopping in accordance with the parameters,
wherein "X" and "Y" are based on physical downlink shared channel or machine type communication downlink control channel or physical uplink shared channel or physical random access channel repetition levels, and
wherein the one or more parameters for frequency hopping are configured via radio resource control (RRC) signaling comprising at least one RRC information element indicating at least one maximum number of repetitions and at least one RRC information element indicating at least one offset.

13. The apparatus according to claim 12, wherein "Y" is based on a channel estimation filter length.

14. The apparatus according to claim 12, wherein "Y" corresponds to ceiling (K/n), "K" corresponds to a number of repetitions, "n" comprising an integer greater than or equal to 2, and "n" comprises a number of hops in one data transmission configured by an evolved Node B.

15. The apparatus according to claim 12, wherein values of "X" and "Y" are same for all repetition levels, and the number of hops is determined according to a repetition number of a related repetition level and "Y".

16. The apparatus according to claim 12, wherein "X" corresponds to Y−1.

17. The apparatus according to claim 12, wherein "Z" is based on an offset or a predefined pattern for physical downlink shared channel or machine type communication downlink control channel or physical uplink shared channel or physical random access channel frequency hopping.

18. The apparatus according to claim 17, wherein the predefined pattern includes half-bandwidth frequency hopping or one-fourth-bandwidth frequency hopping.

19. The apparatus according to claim 12, wherein "Z" comprises an index of a pattern of pre-defined PRBs, where 6 PRBs constitute a PRB block, for physical downlink shared channel or physical uplink shared channel frequency hopping.

20. The apparatus according to claim 19, wherein a position of frequency hopping is indicated by downlink control information (DCI), where additional bits provide information of the position of the 6 PRBs for each hop.

21. The apparatus according to claim 12, wherein "Z" comprises an index of any consecutive 6 PRBs, for physical downlink shared channel or physical uplink shared channel frequency hopping.

22. The apparatus according to claim 12, wherein "Z" is indicated by higher layer signaling, "Z" is indicated for the physical downlink shared channel and physical uplink shared channel by the frequency hopping configuration for the respective channel, and indicated by the frequency hopping configuration in the random access response for the machine type communication DCI.

23. A computer program product, embodied on a non-transitory computer readable medium, the computer program product configured to control a processor to perform a process, comprising:
receiving, by a machine type communication user equipment, parameters for frequency hopping in downlink and uplink, wherein the parameters comprise "X," "Y," and "Z" parameters, "X" corresponds to a duration for which the same physical resource blocks (PRBs) are used for transmission, "Y" corresponds to a frequency hopping period according to a predetermined number of repetitions and a predetermined number of hops in one data transmission configured by an evolved Node B, and "Z" corresponds to a frequency hopping pattern indication; and
performing frequency hopping in accordance with the parameters,
wherein "X" and "Y" are based on physical downlink shared channel or machine type communication downlink control channel or physical uplink shared channel or physical random access channel repetition levels, and
wherein the one or more parameters for frequency hopping are configured via radio resource control (RRC) signaling comprising at least one RRC information element indicating at least one maximum number of repetitions and at least one RRC information element indicating at least one offset.

24. The computer program product according to claim 23, wherein "Y" is based on a channel estimation filter length.

25. The computer program product according to claim 23, wherein "Y" corresponds to ceiling (K/n), "K" corresponds to a number of repetitions, "n" is an integer greater than or equal to 2, and "n" is the number of hops in one data transmission configured by an evolved Node B.

26. The computer program product according to claim 23, wherein the values of "X" and "Y" are the same for all repetition levels, a number of hops is determined according to the repetition number of the related repetition level and "Y".

27. The computer program product according to claim 23, wherein "X" corresponds to Y−1.

28. The computer program product according to claim 23, wherein "Z" is based on an offset or a predefined pattern for physical downlink shared channel or machine type communication downlink control channel or physical uplink shared channel or physical random access channel frequency hopping.

29. The computer program product according to claim 28, wherein, the predefined pattern includes half-bandwidth frequency hopping or one-fourth-bandwidth frequency hopping.

30. The computer program product according to claim 23, wherein "Z" comprises an index of a pattern of pre-defined (PRBs), where 6 PRBs constitute a PRB block, for physical downlink shared channel or physical uplink shared channel frequency hopping.

31. The computer program product according to claim 30, wherein a position of frequency hopping is indicated by downlink control information (DCI), where additional bits provide the information of the position of the 6 PRBs for each hop.

32. The computer program product according to claim 23, wherein "Z" is the index of any consecutive 6 PRBs, for physical downlink shared channel or physical uplink shared channel frequency hopping.

33. The computer program product according to claim 23, wherein "Z" is indicated by higher layer signaling, "Z" is indicated for the physical downlink shared channel and physical uplink shared channel by the frequency hopping configuration for the respective channel, and indicated by the frequency hopping configuration in the random access response for the machine type communication downlink control channel.

* * * * *